(12) United States Patent
Whitlock et al.

(10) Patent No.: US 9,169,862 B2
(45) Date of Patent: Oct. 27, 2015

(54) SELF-ALIGNING SLEEVED PROTRUDING HEAD FASTENERS WITH ELECTROMAGNETIC EFFECT PROTECTION FEATURES

(71) Applicant: The Boeing Company, Chicago, IL (US)

(72) Inventors: Richard P. Whitlock, Seattle, WA (US); Peter A. Coronado, Renton, WA (US); Sean D. Morden, Federal Way, WA (US); Randall A. Rogers, Auburn, WA (US); Julie M. Drexler, Renton, WA (US); John R. Porter, Lynnwood, WA (US); Jeffry G. Bickford, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 13/770,256

(22) Filed: Feb. 19, 2013

(65) Prior Publication Data

US 2014/0230228 A1    Aug. 21, 2014

(51) Int. Cl.
| F16B 43/02 | (2006.01) |
| F16B 19/00 | (2006.01) |
| B64D 45/02 | (2006.01) |
| F16B 19/02 | (2006.01) |
| F16B 35/06 | (2006.01) |

(52) U.S. Cl.
CPC .............. *F16B 19/008* (2013.01); *B64D 45/02* (2013.01); *F16B 43/02* (2013.01); *F16B 19/02* (2013.01); *F16B 35/06* (2013.01); *Y10T 29/49948* (2015.01)

(58) Field of Classification Search
CPC ....... F16B 43/02; F16B 43/00; F16B 13/0825
USPC ................ 411/537, 371.2, 529, 60.1, 69, 380
See application file for complete search history.

(56) References Cited

U.S. PATENT DOCUMENTS

| 1,352,918 | A | * | 9/1920 | Rohbock ........................ 411/392 |
| 2,552,004 | A |   | 5/1951 | Erdman |
| 3,382,630 | A | * | 5/1968 | Chivers ........................... 52/208 |

(Continued)

FOREIGN PATENT DOCUMENTS

| DE | 2642349 A1 | 4/1977 |
| EP | 0066031 A1 | 12/1982 |

(Continued)

OTHER PUBLICATIONS

Ransom et al: "Hole Protection with Expanded Grommets in Carbon Fiber Reinforced Plastic", Global Material Technology: Soaring to New Horizons: 2009 Sampe Fall Technical Conference & Exhibition, Oct. 19-22, 2009, Whichita, Kansas, Covina: Society for the Advancement of Material and Process Engineering, Jan. 1, 2009, pp. 1-12, ISBN: 978-1-934551-06-6 p. 1, paragraph 2—p. 2 last paragraph; figure 5.

*Primary Examiner* — Flemming Saether

(74) *Attorney, Agent, or Firm* — Felix L. Fischer

(57) ABSTRACT

A fastener system for composite structure provides electromagnetic energy protection by incorporating a self-aligning head (SAH) fastener having a head with a spherical engaging surface and a shank extending from the head for insertion through a hole in a composite structure and a self-aligning self sealing (SASS) washer having a throat receiving the shank and a spherical mating surface interfacing with the spherical engaging surface of the head.

24 Claims, 17 Drawing Sheets

(56) References Cited

U.S. PATENT DOCUMENTS

| | | | |
|---|---|---|---|
| 3,422,721 A | | 1/1969 | Yonkers |
| 3,661,046 A | | 5/1972 | Waud et al. |
| 4,177,999 A | * | 12/1979 | Raber .......................... 411/542 |
| 4,630,168 A | | 12/1986 | Hunt |
| 4,830,557 A | * | 5/1989 | Harris et al. .................. 411/113 |
| 4,860,513 A | * | 8/1989 | Whitman ....................... 52/410 |
| 5,542,777 A | * | 8/1996 | Johnson ........................ 403/389 |
| 6,282,857 B1 | * | 9/2001 | Rubenacker ................... 52/410 |
| 6,296,319 B1 | * | 10/2001 | Hummel et al. ......... 301/35.621 |
| 7,599,164 B2 | | 10/2009 | Heeter et al. |
| 7,695,226 B2 | | 4/2010 | March et al. |
| 7,755,876 B2 | | 7/2010 | Morrill et al. |
| 7,850,410 B1 | * | 12/2010 | Curtis ........................... 411/537 |
| 8,475,102 B2 | * | 7/2013 | Haylock et al. ............... 411/361 |
| 8,573,910 B2 | * | 11/2013 | March et al. .................... 411/43 |
| 2010/0270513 A1 | | 10/2010 | Haylock et al. |
| 2010/0272537 A1 | | 10/2010 | Haylock et al. |

FOREIGN PATENT DOCUMENTS

| | | |
|---|---|---|
| EP | 2463532 A1 | 6/2012 |
| EP | 2500273 A2 | 9/2012 |
| WO | 2005064771 A1 | 7/2008 |
| WO | 2012107741 A1 | 8/2012 |

* cited by examiner

SELF-ALIGNING SLEEVED PROTRUDING HEAD FASTENERS WITH ELECTROMAGNETIC EFFECT PROTECTION FEATURES

BACKGROUND INFORMATION

1. Field

Embodiments of the disclosure relate generally to the field of fastener technologies for metal fasteners employed in composite structures and more particularly to a fastener with a spherical head shaped such that it mates with a spherical washer containing a polymeric ring mechanically attached to its base to create a pressure contained system preventing hot particle ejection and edge sparking during lightning conditions.

2. Background

Structural fabrication using composites still requires fasteners for many assembly operations. Metallic fasteners are conductive creating electromagnetic effect (EME) design considerations for lightning strike and other EME issues. Fastener sparking modes must be designed for Lightning conditions include Hot Particle Ejection (HPE) and arcing between an outer surface of the fastener head and other structure or fastener sleeves.

When lightning strikes a Carbon Fiber Reinforced Polymer (CFRP) structure, a significant portion of the current may pass into nearby structures through fasteners. When the electrical energy passes between two surfaces, contact resistance heating may break down the materials and generate hot gas (or plasma) in the hole, or in the space in-between a fastener and an associated internally threaded fastener such as a nut or frangible collar. If the pressure generated is large enough, the gas may find a low pressure path, and escape from the fastener system into a fueled area. That path is sometimes in the surface under the protruding fastener head. These escaping gasses may be hot enough to erode the metal parts (fastener or structure) as they escape, creating particles or droplets known as HPE.

As the lightning strike electrical energy is conducted between structural joints the energy passes through the metallic fasteners. The protruding fastener head of certain fasteners have experienced arcing between the edge of the fastener head and structure in contact with the head. The arcing may be present between fastener head and the structure, or the fastener head and sleeve, if a sleeved fastener is being used.

Existing fastening systems typically require installation of the fastener with the addition of the time and labor intensive processes of installation of premolded caps over fastener heads or other procedures such as removing dielectric coatings from exposed surfaces of the fastener heads.

It is therefore desirable to provide a fastening system suitable for composite structural applications which overcomes both HPE and arcing while overcoming the drawbacks of the prior art fastener installation procedures.

SUMMARY

Embodiments disclosed herein provide a fastener system for composite structure providing electromagnetic energy protection incorporating a self-aligning head (SAH) fastener having a head with a spherical engaging surface and a shank extending from the head for insertion through a hole in a composite structure and a self-aligning self sealing (SASS) washer having a throat receiving the shank and a spherical mating surface interfacing with the spherical engaging surface of the head.

The embodiments allow a method of installation of an EME protection fastener system by identifying a hole in a composite structure for insertion of a fastener and inserting a body of a sleeve in the hole with a flange contacting the surface of the structure. A seal is then inserted in a seal relief in an SASS washer and the SASS washer is positioned over the hole and sleeve flange with a bottom land in contact with the sleeve flange. A SAH fastener is inserted into the sleeve expanding the sleeve for an interference fit between both the sleeve body and SAH fastener shank and the sleeve body and composite hole. A spherical engaging surface on a head of the SAH fastener interfaces with a spherical mating surface on the SASS washer to accommodate angular offset in the SAH fastener due to non-orthogonality of the hole. A internally threaded fastener is then torqued on threads in an end of the SAH fastener.

Fabrication of the embodiments for an EME protection fastener system may be accomplished by providing a SAH fastener shank with and a taper on the shank. Threads are created on a first end of the shank and a head having a spherical engaging surface is provided on a second end of the shank. A wrenchable counter-bore is provided in the shank for providing counter torque and preventing rotation of the SAH fastener. The SAH fastener is provided with a dielectric coating. A SASS washer is provided with a throat to receive the shank of the SAH fastener and a spherical mating surface to receive the engaging surface of the SAH fastener head. A flare in the throat accommodates angular displacement of the shank. A seal relief is provided to receive a seal. A bottom land is provided on the SASS washer inboard of the seal relief for contacting a sleeve flange. A dielectric coating is provided on the SASS washer excluding the bottom land. A sleeve having a flange to contact the bottom land of the SASS washer and a body for insertion into a structural hole and to receive the shank of the SAH fastener is provided.

The features, functions, and advantages that have been discussed can be achieved independently in various embodiments of the present disclosure or may be combined in yet other embodiments further details of which can be seen with reference to the following description and drawings.

DETAILED DESCRIPTION

The present embodiments provide a protruding head EME fastener with a spherical head shaped mating with a spherical washer containing a polymeric ring mechanically attached to the base of the spherical washer. The mating pieces create a pressure contained system to prevent HPE (high energy sparks) and edge sparking during lightning conditions. In addition the fasteners demonstrated in the current embodiments can be installed into a hole in a structure that is drilled with an angle greater than 0 degrees (i.e. non-orthogonal to the surface). The spherical geometry of the mating pieces may incorporate more material thickness to accommodate greater angles (i.e. +/−6°) or less material for weight savings to accommodate smaller angles (i.e. +/−2°). The spherical geometry reduces point loads during clamp-up and consequently prevents scraping of the mating parts to present potential electrical bond paths issues. Installation of the fastener without additional sealing or processing requirements meets lightning requirements.

Figure 1:
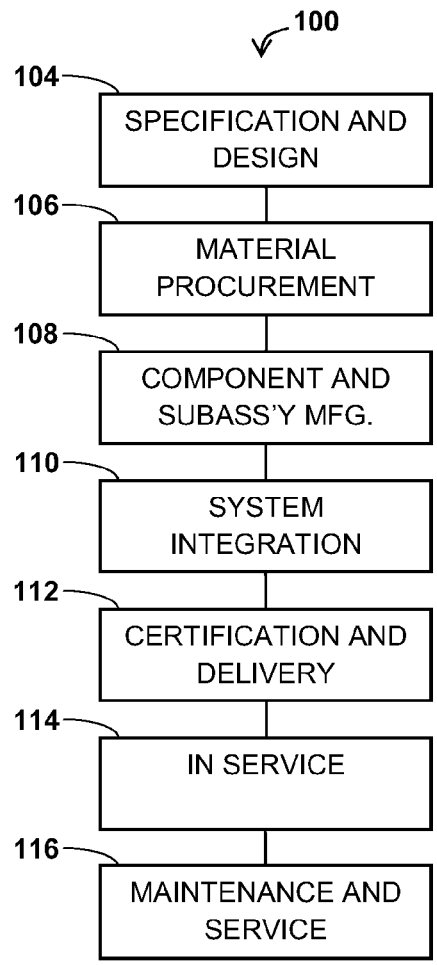
FIG. 1 is a flow diagram of aircraft production and service methodology.
Figure 2:
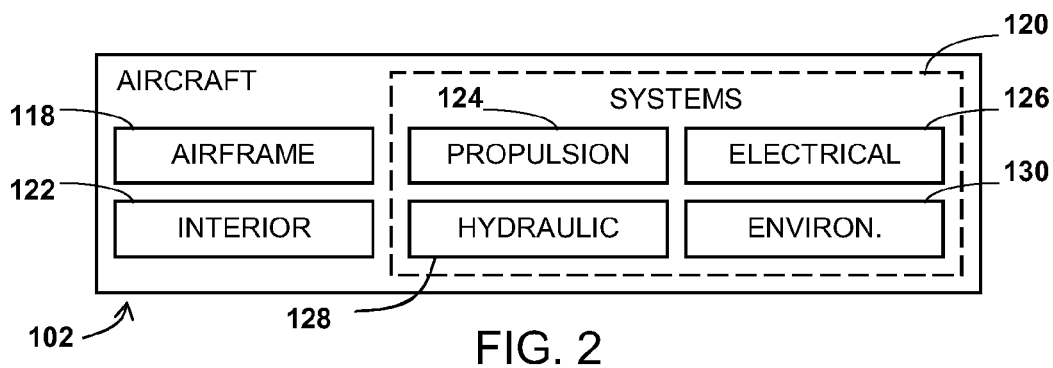
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
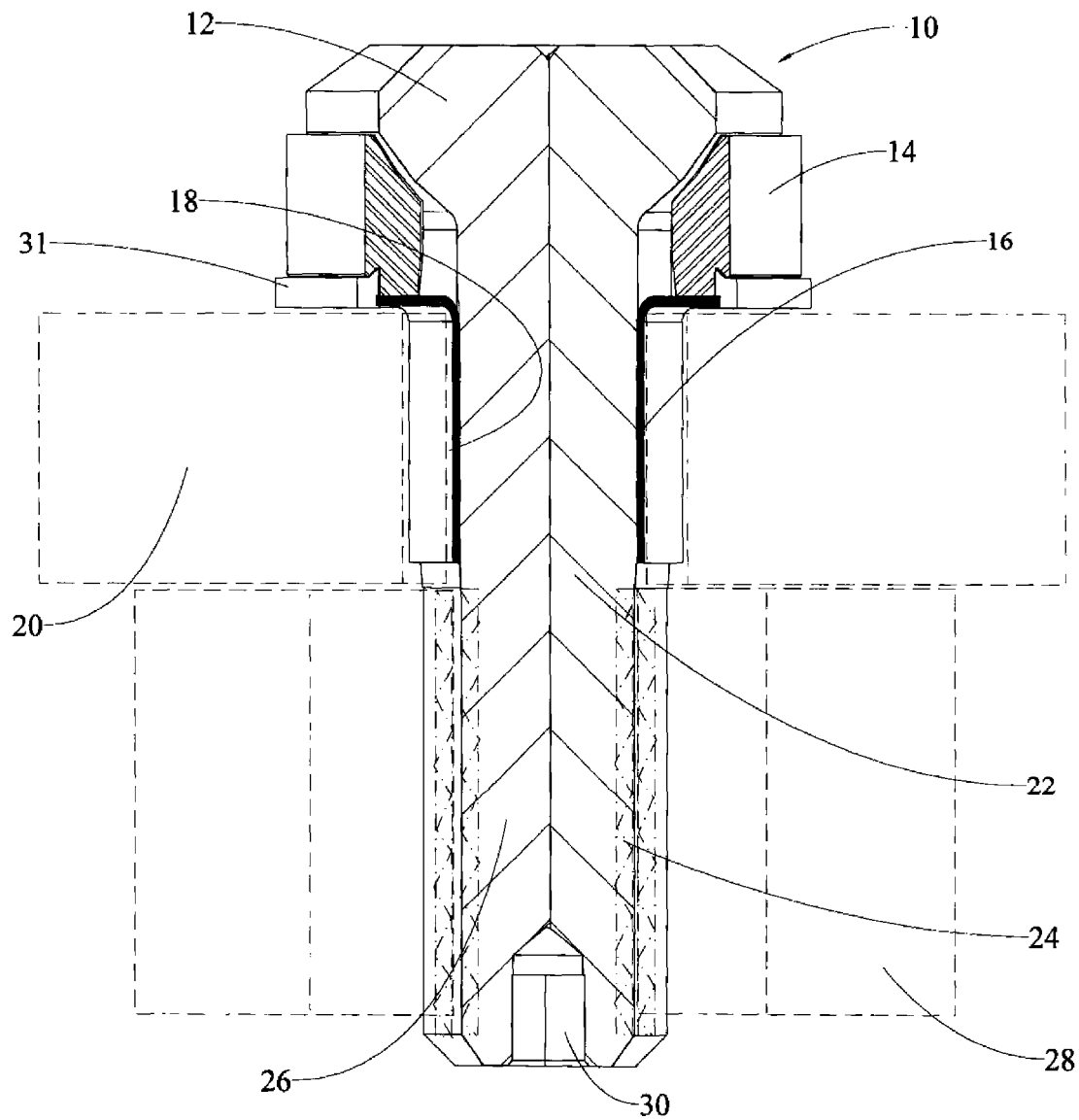
FIG. 3 is a side section view of a first embodiment of a fastener for EME protection.

The embodiments described herein provide a fastener system providing EME protection available for use in assembly requirements in the methods or systems of an aircraft as defined in FIGS. 1 and 2 and described above or any similar structural assembly. As shown in FIG. 3, a first embodiment of the fastener system 10 incorporates a self-aligning head (SAH) fastener 12 which is received in a seal-aligning self-sealing (SASS) washer 14. A sleeve 16, inserted in an assembly hole 18 in the structure 20 in which the fastener system will be employed, receives a shank 22 of the SAH fastener 12 with threads 24 on a first end 26 of the SAH fastener received in a internally threaded fastener 28 such as a nut or frangible collar. A multi-faceted or multi-lobed wrenchable counter-bore 30 such as a hex head counter-bore in the shank is employed as a wrenching receptacle for torquing the fastener system. A seal 31 is provided between the SASS washer 14 and the structure 20.

Figure 4A:
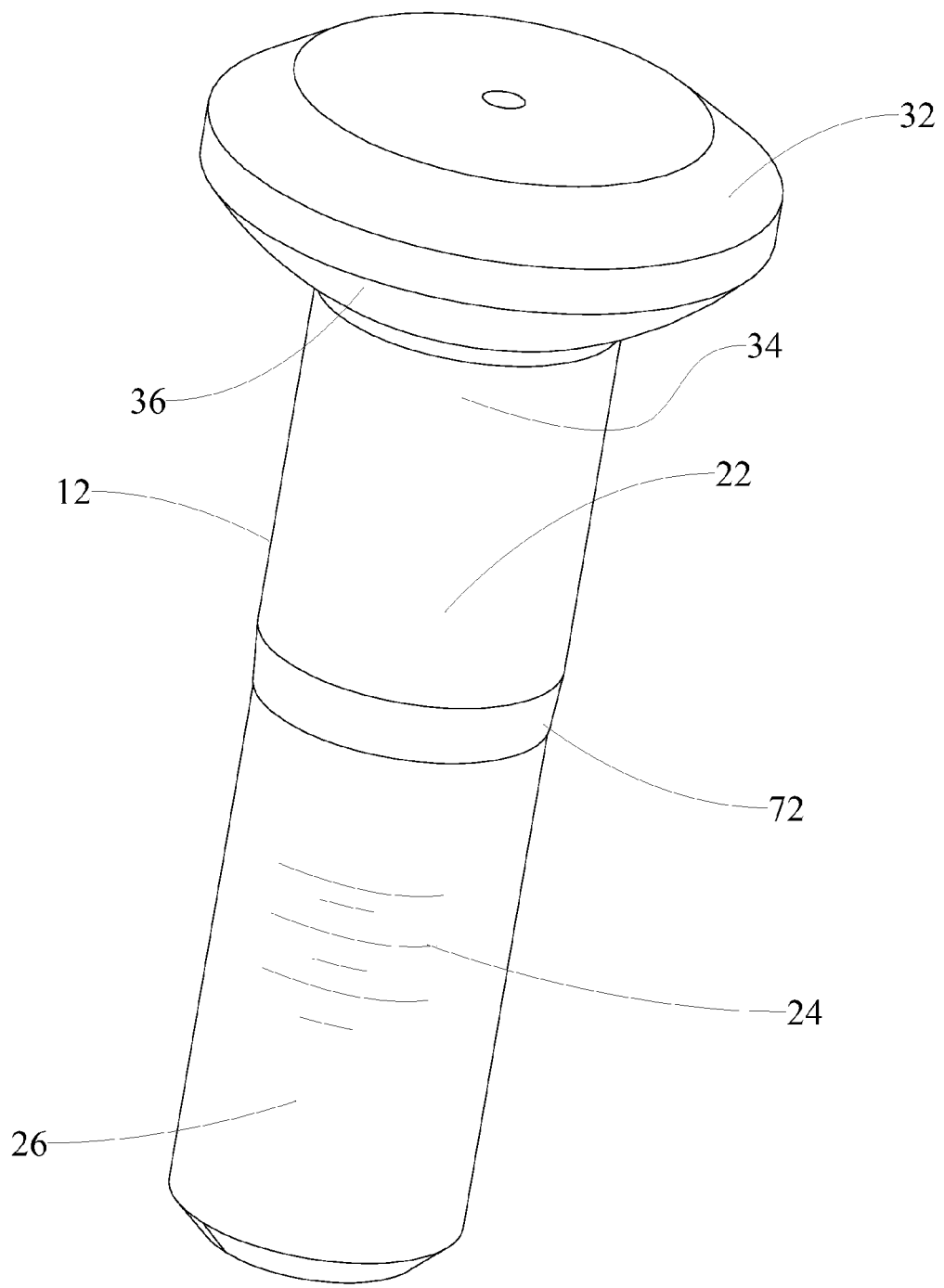
FIG. 4A is an isometric view of the self-aligning head fastener element.
Figure 4B:
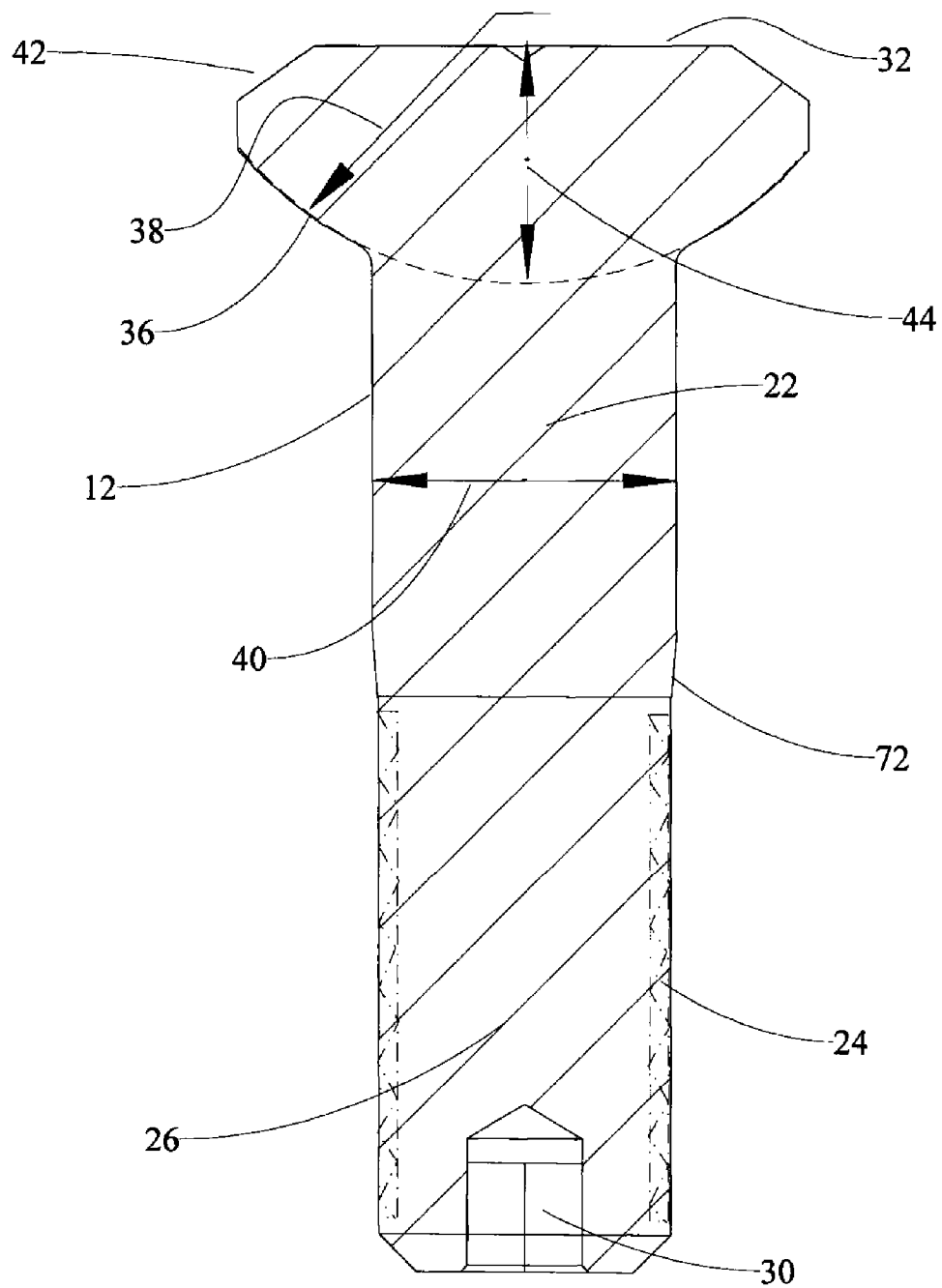
FIG. 4B is a side section view of the self-aligning head fastener element.

The SAH fastener 12 is shown in detail in FIGS. 4A and 4B. Head 32 extends from a second end 34 of the SAH fastener 12 opposite threaded end 26. An engaging surface 36 on the head is interfaced to a mating surface in the SASS washer (to be described in greater detail with respect to FIGS. 5A and 5B). The engaging surface 36 is substantially spherical thereby providing alignment with the SASS washer 14 independent of any angular displacement of the washer or angular displacement of the shank 22 of the SAH fastener due to a non-orthogonal hole in the structure. For example embodiments, a spherical radius 38 having a ratio of approximately 1.5 times the diameter of the fastener shank diameter 40 is employed. A chamfer 42 of the outer periphery of the head 32 is provided for surface blending with the SASS washer. For exemplary embodiments, the SAH fastener is fabricated from 6AL-4V Titanium alloy and coated with a dielectric or electrically insulative coating. In an exemplary embodiment the coating is a bonded epoxy resin coating. For exemplary embodiments, relative head thickness 44 of approximately 0.6 times shank diameter of the fastener provides the ability to accept angular displacement of +/−6° while a reduced head thickness of approximately 0.17 times shank diameter provides for angular displacement of +/−2° with appropriate mating thicknesses of the SASS washer 14 as will be described in greater detail subsequently. The ability to accommodate the angular displacement of the fastener due to non-orthogonal holes minimizes point loads that could cause small contact areas and lead to possible high voltage break downs thereby enhancing the EME protection provided by the embodiment.

Figure 5A:
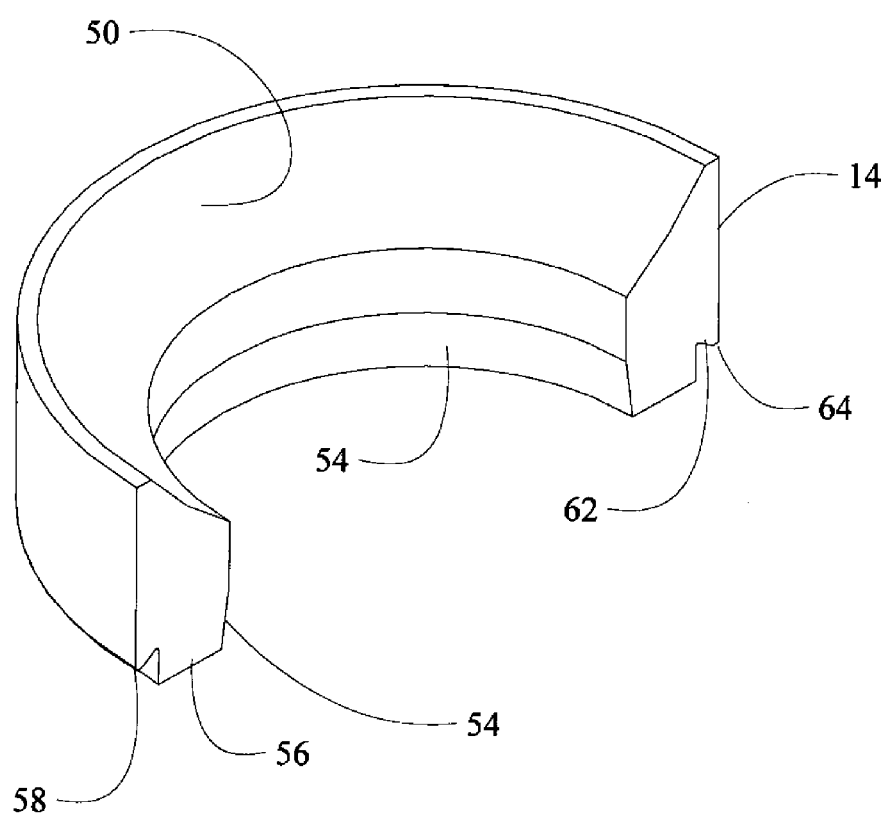
FIG. 5A is an isometric section view of a the self-aligning self-sealing mating washer for the first embodiment of FIG. 3.
Figure 5B:
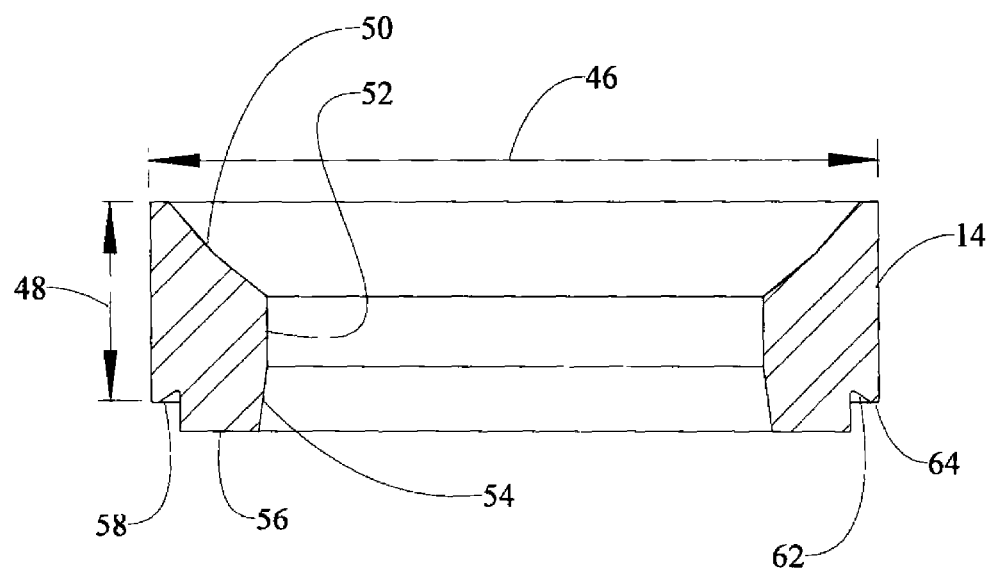
FIG. 5B is a side section view of self-aligning self-sealing mating washer of FIG. 5A.

FIGS. 5A and 5B show details of the SASS washer 14 of the embodiment of the fastener shown in FIG. 3. The SASS washer 14 has an external diameter 46 sized to receive the head 32 of the SAH fastener 12. External diameter 46 is substantially constant over the thickness 48 of the SASS washer. As previously described, a mating surface 50 in the SASS washer having a substantially spherical shape interfaces with the engaging surface 36 on the head 32 of the SAH fastener 12. A throat 52 receives the shank 22 of the SAH fastener and is provided with a flare 54 to further accommodate angular displacement of the fastener. In other embodiments an increased diameter of the throat alternatively be employed to accommodate the angular displacement of the fastener. As previously described, thickness 48 of the washer may be adjusted commensurate with thickness of the fastener head 32 to accommodate desired angular displacement angles and establish an angular deflection limit for the SAH fastener. In exemplary embodiments a thickness relationship of 0.67 times shank diameter provides +/−6° while a reduce thickness of 0.19 times shank diameter provides +/−2°. A bottom land 56 on the SASS washer 14 interfaces with a flange 60 on the sleeve 16 as will be described in greater detail subsequently. A seal relief 58 surrounds the bottom land 56 to receive the seal 31. Seal 31 surrounds the periphery of the flange 60 of the sleeve 16, to be described in greater detail with respect to FIGS. 6A and 6B. Relief 58 includes an angled expansion volume 62 diametrically inward from a pinch surface 64 for engagement of the seal 31 as will be described in greater detail with respect to FIGS. 7A and 7B. This configuration enhances sealing to prevent any gas present in the space between the fastener head and structure or fastener head and sleeve from escaping. For exemplary embodiments, the SASS washer 14 is fabricated from A286 CRES and also is provided with dielectric or electrically insulative coating. This dielectric coating on the outer portion of the SASS washer provides a dielectric barrier between the bottom of the washer and the structure or sleeve. The dielectric coating prevents arcing at the edge of the mated SAH fastener head and SASS washer and the structure and/or sleeve. The bottom land 56 is masked to preclude coating or the coating is removed providing a bare metal surface. Similarly, the engaging surface 36 and the mating surface 50 may be masked to preclude coating or the coating may be removed to provide a bare metal surface.

Figure 6A:
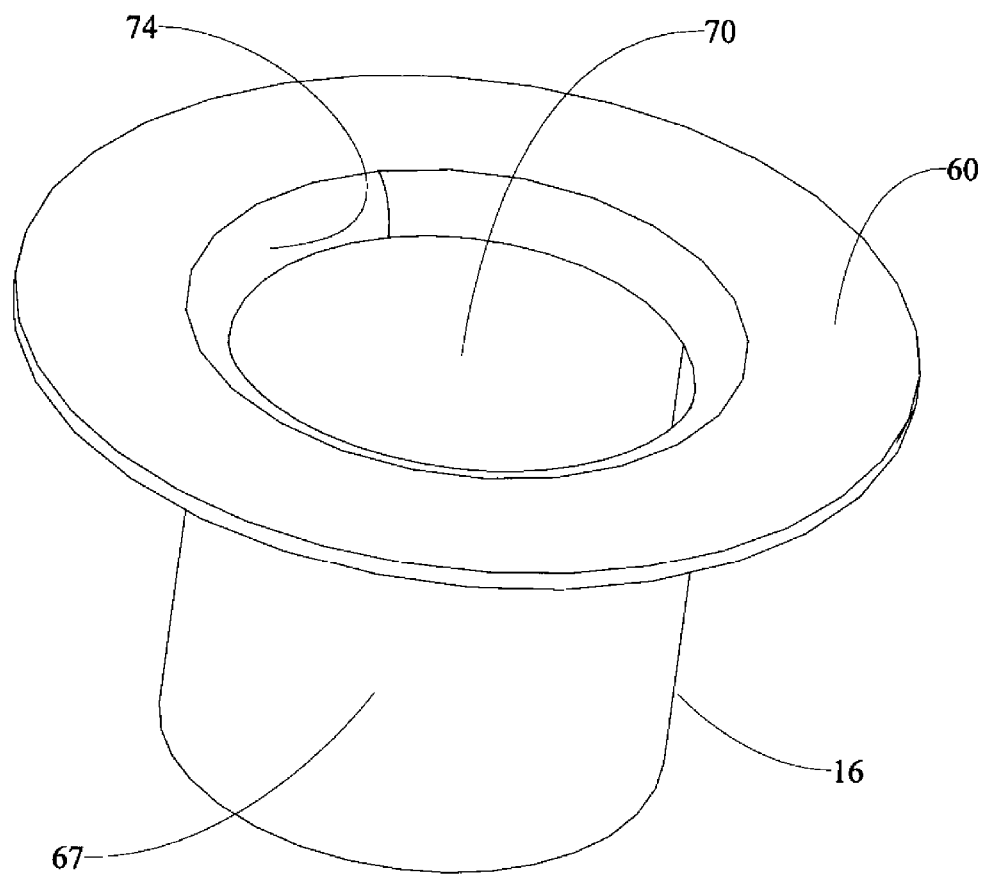
FIG. 6A is an isometric view of the sleeve.
Figure 6B:
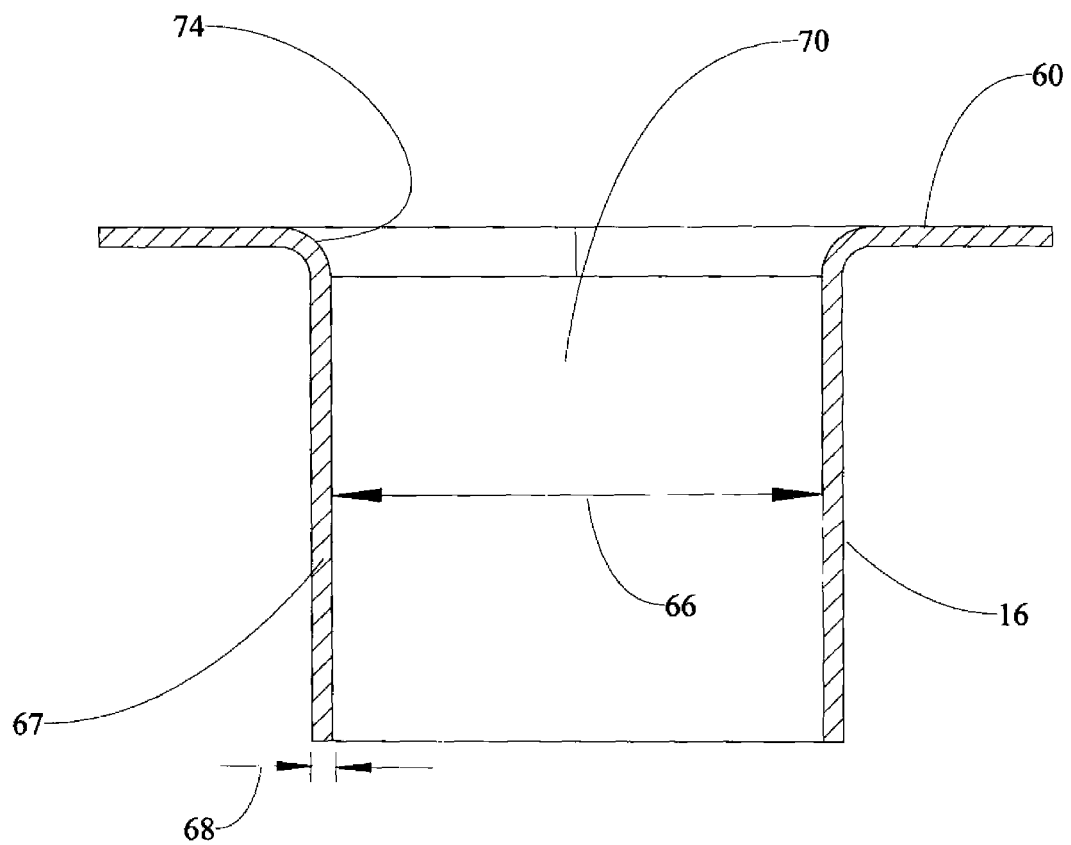
FIG. 6B is a side section view of the sleeve.

The sleeve 16, best seen in FIGS. 6A and 6B mates with the shank 22 of the fastener and allows for installation into interference fit holes in composite. An inner diameter (ID) 66 of a body 67 of the sleeve is smaller than the diameter 40 of the fastener shank 22. The combined ID 66 and thickness 68 of the body 67 allows the sleeve 16 to be installed into the composite without damage. The surface of ID 66 of the sleeve is lubricated and allows the fastener 12 to make the sleeve 16 radially expand when the fastener shank 22 slides into the sleeve body 67 preventing damage to the composite while increasing the contact area between fastener shank and sleeve hole 70 as well as the sleeve 16 and assembly hole 18 in the structure. A taper 72 or radius lead-in geometry on the fastener shank 22 (best seen in FIGS. 4A and 4B) and a fillet 74 between the flange 60 and body 67 on the sleeve are employed to enhance insertion alignment of the SAH fastener 12 into the sleeve 16 and expansion of the sleeve. Increased contact area improves the electrical path with mating structure and minimized air gaps that can lead to potential HPE. Flange 60 provides a conducting contact surface for the bottom land 56 of the SASS washer. Absence of the dielectric coating on the bottom land 56 of the SASS washer improves conductivity between the bottom of the washer and the sleeve. The absence of coating improves the conductive path of the energy transferred from the sleeve to the washer and prevents any arcing at the edge of the fastener head and sleeve. Additionally the bottom portion of the sleeve is coated with a dielectric or insulative coating to prevent arcing between the sleeve and counter-bore of the mating internally threaded fastener such as a nut or frangible collar.

For exemplary embodiments, the sleeve 16 is fabricated from A286 CRES. The surface of ID 66 of the sleeve body 67 may be Aluminum coated.

Figure 7A:
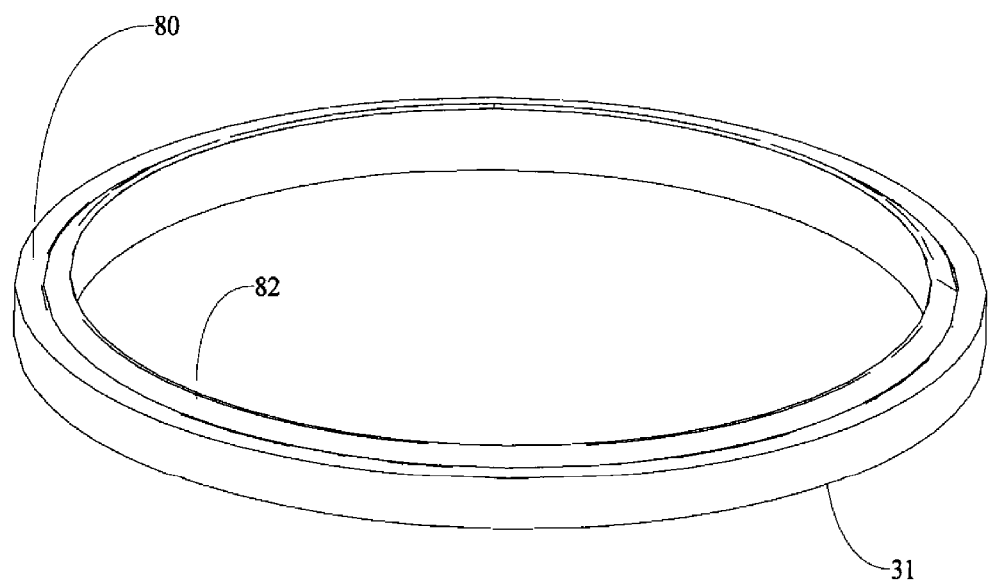
FIG. 7A is an isometric view of the seal employed with the self-aligning self-sealing mating washer of FIGS. 5A and 5B.
Figure 7B:
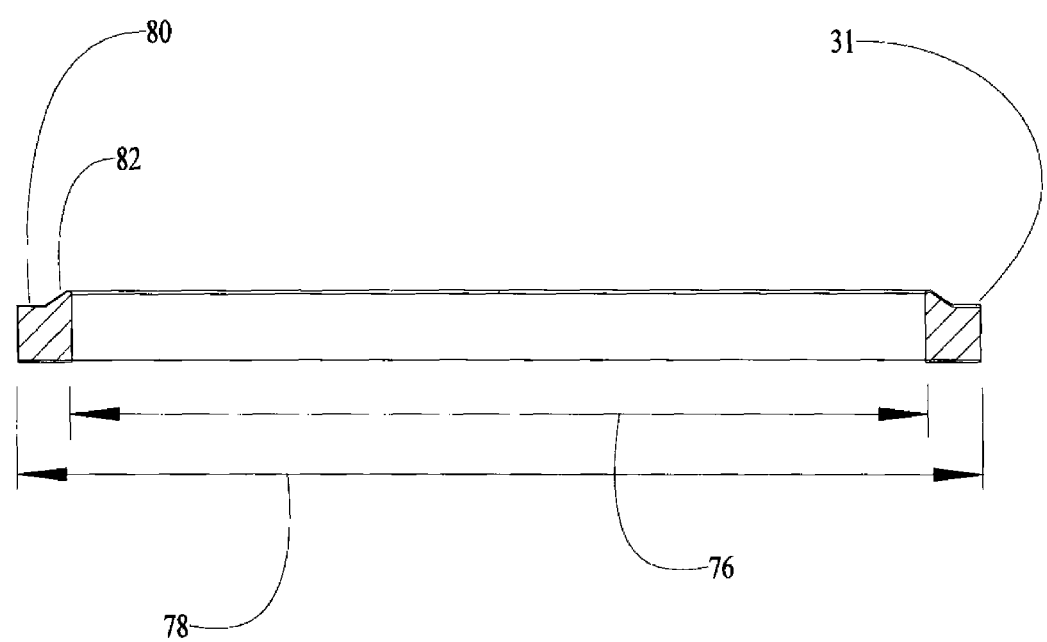
FIG. 7B is a side section view of the seal of FIG. 7A.

FIGS. 7A and 7B show details of an exemplary seal 31 for the embodiment of FIG. 3. Seal 31 has an inner diameter 76 sufficient to clear bottom land 56 of the SASS washer and flange 60 of the sleeve 16. Outer diameter 78 is substantially the same as diameter 46 of the SASS washer providing a sealing ring 80 to be engaged between the pinch surface 64 and the structure 20. An angular bead 82 is provided to be received in the angled expansion volume 62 in the SASS washer. For example embodiment, the seal is polymeric and surrounds the outer portion of the SASS washer 14 such that there is a seal between the bottom of the washer and the structure or sleeve. The dielectric seal prevents any arcing at the edge of the joined SAH fastener head and SASS washer and the structure and/or sleeve in addition to keeping in HPE.

Figure 8:
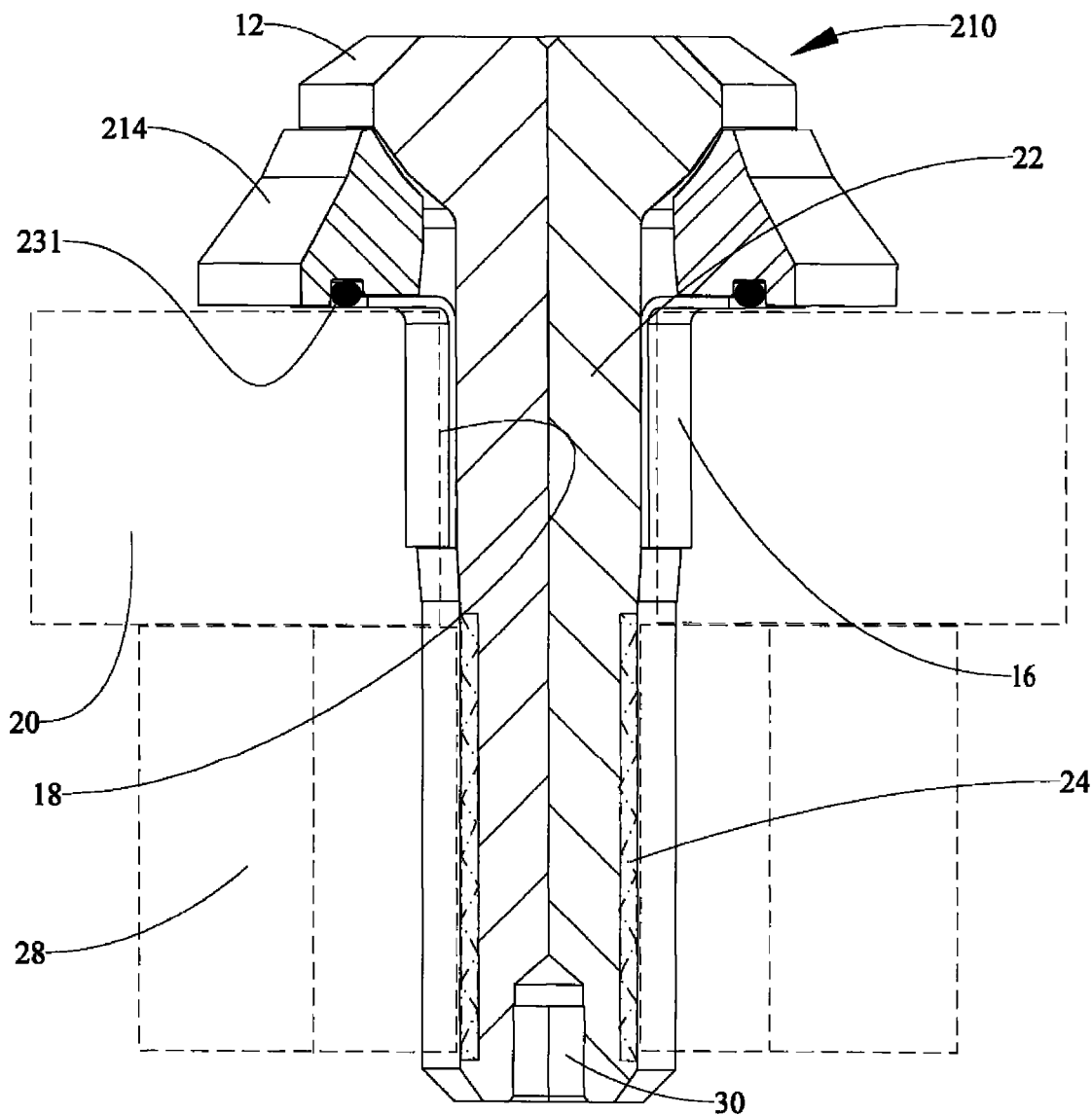
FIG. 8 is a side section view of a second embodiment of a fastener for EME protection.

A second embodiment of the fastener system 210 is shown in FIG. 8. The fastener system 210 incorporates a SAH fastener 12 substantially identical to that previously described with respect to FIGS. 4A and 4B which is received in a seal-aligning self-sealing (SASS) washer 214. A sleeve 16, substantially identical to that previously described with respect to FIGS. 6A and 6B, inserted in an assembly hole 18 in the structure 20 in which the fastener system will be employed, receives the shank 22 of the SAH fastener 12 with threads 24 on a first end 26 of the SAH fastener received in a internally threaded fastener 28 such as a nut or frangible collar. A multi-faceted or multi-lobed wrenchable counter-bore 30 such as a hex head counter-bore in the shank is employed for counter torque and preventing rotation of the fastener system. A seal 231 is provided between the SASS washer 14 and the structure 20.

Figure 9A:
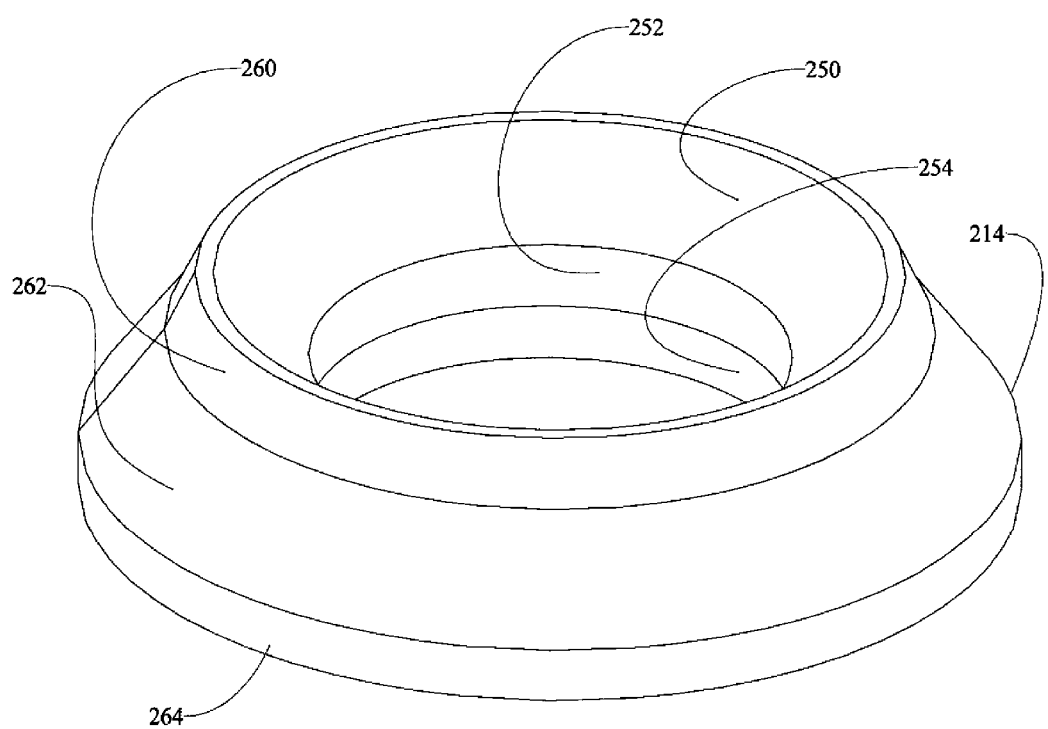
FIG. 9A is an isometric view of a self-aligning self-sealing mating washer in the embodiment of FIG. 8.
Figure 9B:
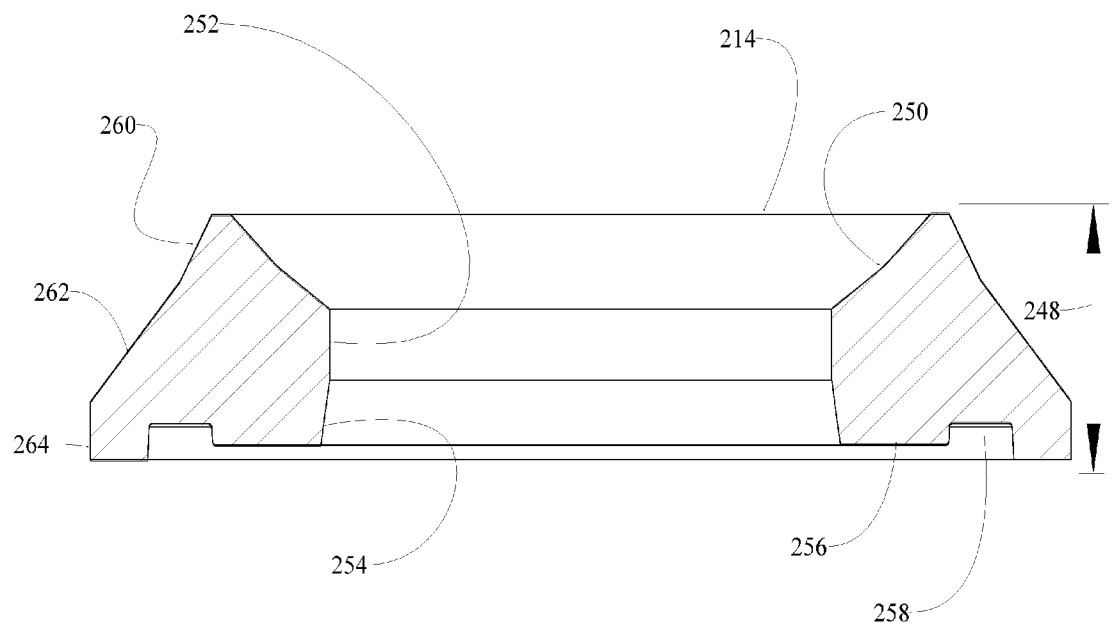
FIG. 9B is a side section view of the self-aligning self-sealing mating washer of FIG. 9A.

FIGS. 9A and 9B show details of the SASS washer 214 of the embodiment of the fastener shown in FIG. 8. The SASS washer 214 has a diameter 246 sized to receive the head 32 of the SAH fastener 12. Diameter of washer 214 expands over the thickness 248 of the SASS washer with a first conical surface 260 and a second conical surface 262 terminating in a cylindrical foot 264. As with the prior embodiment, a mating surface 250 in the SASS washer having a substantially spherical shape interfaces with the engaging surface 36 on the head 32 of the SAH fastener 12. A throat 252 receives the shank 22 of the SAH fastener and is provided with a flare 254 to further accommodate angular displacement of the fastener. As previously described, thickness 248 of the washer may be adjusted commensurate with thickness of the fastener head 32 to accommodate desired angular displacement angles. A bottom land 256 on the SASS washer 214 interfaces with the flange 60 on the sleeve 16 as previously described. A seal relief 258 surrounds the bottom land 256 to receive the seal 231. Seal 231 surrounds the periphery of the flange 60 of the sleeve 16. Relief 258 is inboard of the foot 264 for engagement of the seal 231 which will be described in greater detail with respect to FIGS. 10A and 10B. This configuration further enhances sealing to prevent any gas present in the space between the fastener head and structure or fastener head and sleeve from escaping. For exemplary embodiments, the SASS washer 214 is fabricated from A286 CRES and also is provided with a dielectric coating. This dielectric coating on the outer portion of the SASS washer provides a dielectric barrier between the bottom of the washer and the structure or sleeve. The dielectric coating prevents arcing at the edge of the mated SAH fastener head and SASS washer and the structure and/or sleeve. The bottom land 256 is masked to preclude coating or the coating is removed to provide a bare metal surface. Similarly, the engaging surface 36 and the mating surface 250 may be masked to preclude coating or the coating may be removed to provide a bare metal surface.

Figure 10A:
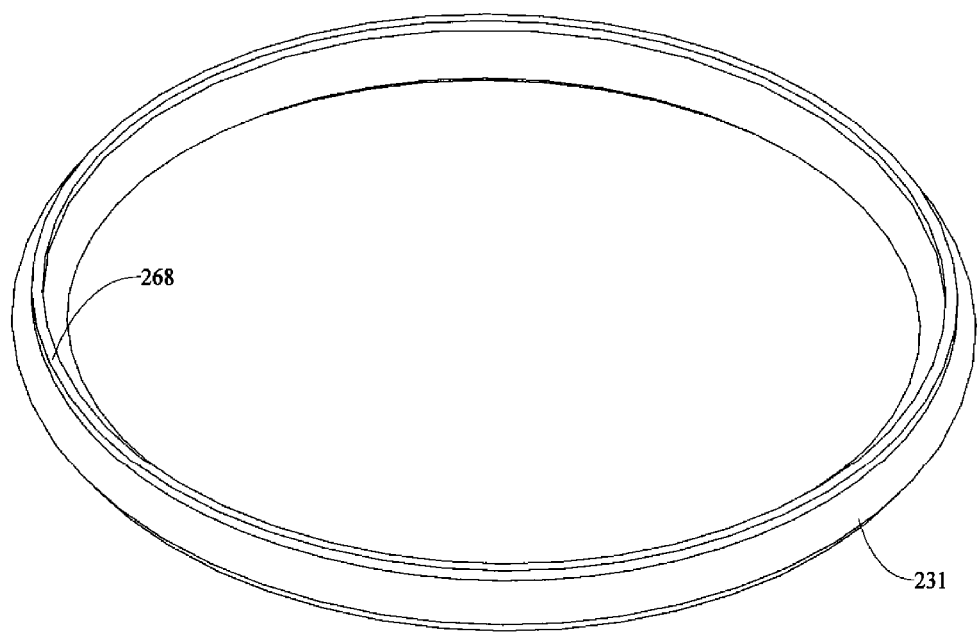
FIG. 10A is an isometric view of a seal for the self-aligning self-sealing mating washer of FIGS. 9A and 9B.
Figure 10B:
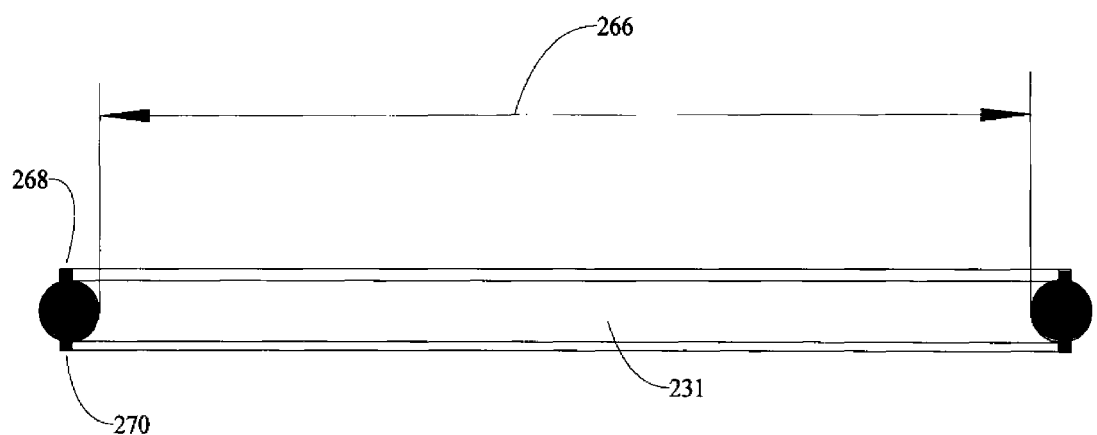
FIG. 10B is a side section view of the seal of FIG. 10A.

The seal 231 for the embodiment of FIG. 8 is shown in detail in FIGS. 10A and 10B. The seal 31 is a modified O-ring having a diameter 266 sized for the seal to be received in the relief 258. A top rectangular bead 268 and a bottom rectangular bead 270 are parting lines inherent to the manufacturing of the material.

Figure 11:
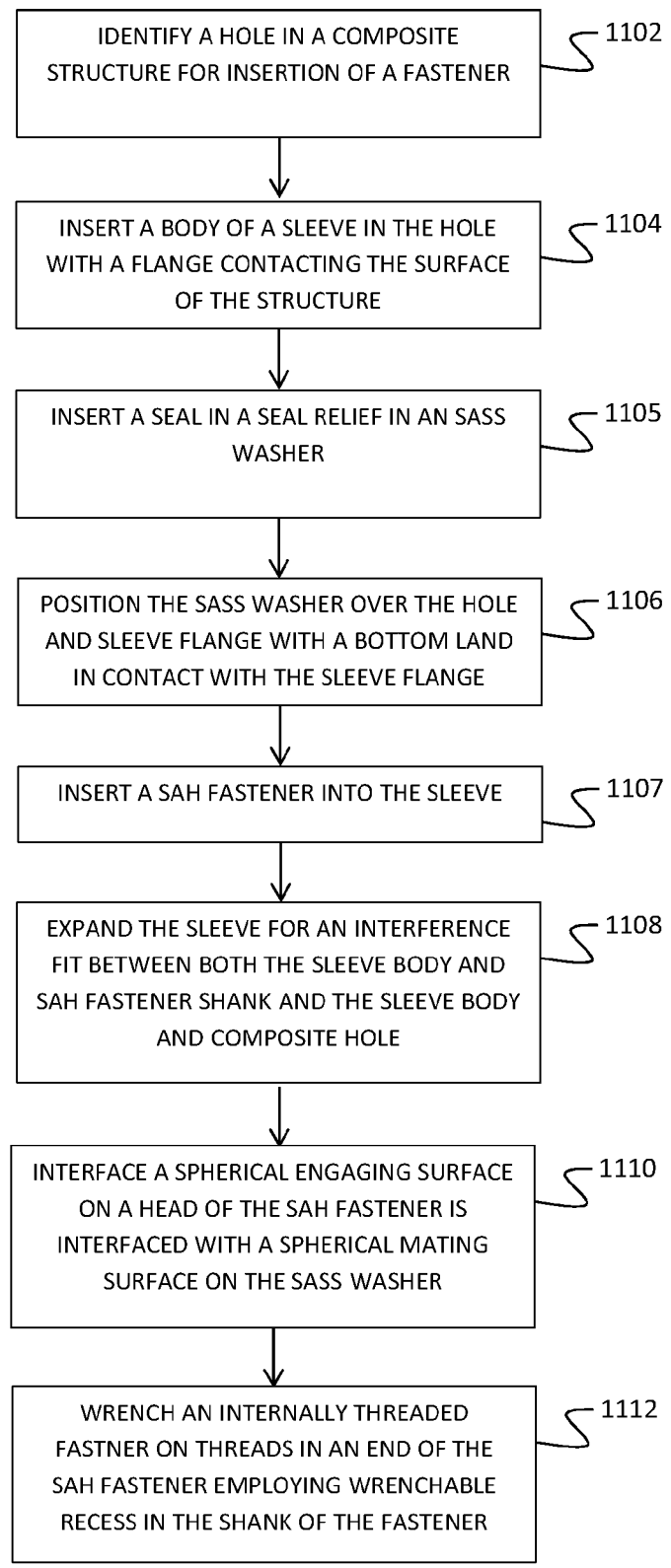
FIG. 11 is a flow chart of a method of implementing the example embodiments for fasteners with EME protection.

The embodiments disclosed herein are employed for fastener EME protection in a method as described in FIG. 11. A hole in a composite structure is identified for insertion of a fastener, step 1102. A body of a sleeve is inserted in the hole with a flange contacting the surface of the structure, step 1104. A seal is inserted in a seal relief in an SASS washer, step 1105, and the SASS washer is positioned over the hole and sleeve flange with a bottom land in contact with the sleeve flange, step 1106 and a SAH fastener is inserted into the sleeve, step 1107, guided by a filleted connection between the flange of the sleeve and the body of the sleeve and a tapered section on a shank of the SAH fastener, the sleeve is expanded for an interference fit between both the sleeve body and SAH fastener shank and the sleeve body and composite hole, step 1108. A spherical engaging surface on a head of the SAH fastener is interfaced with a spherical mating surface on the SASS washer, step 1110, to accommodate angular offset in the SAH fastener due to non-orthogonality of the hole. An internally threaded fastener such as a nut or frangible collar is torqued on threads in an end of the SAH fastener employing multi-faceted or multi-lobed wrenchable counter-bore such as a hex head bore in the shank of the fastener, step 1112.

Figure 12:
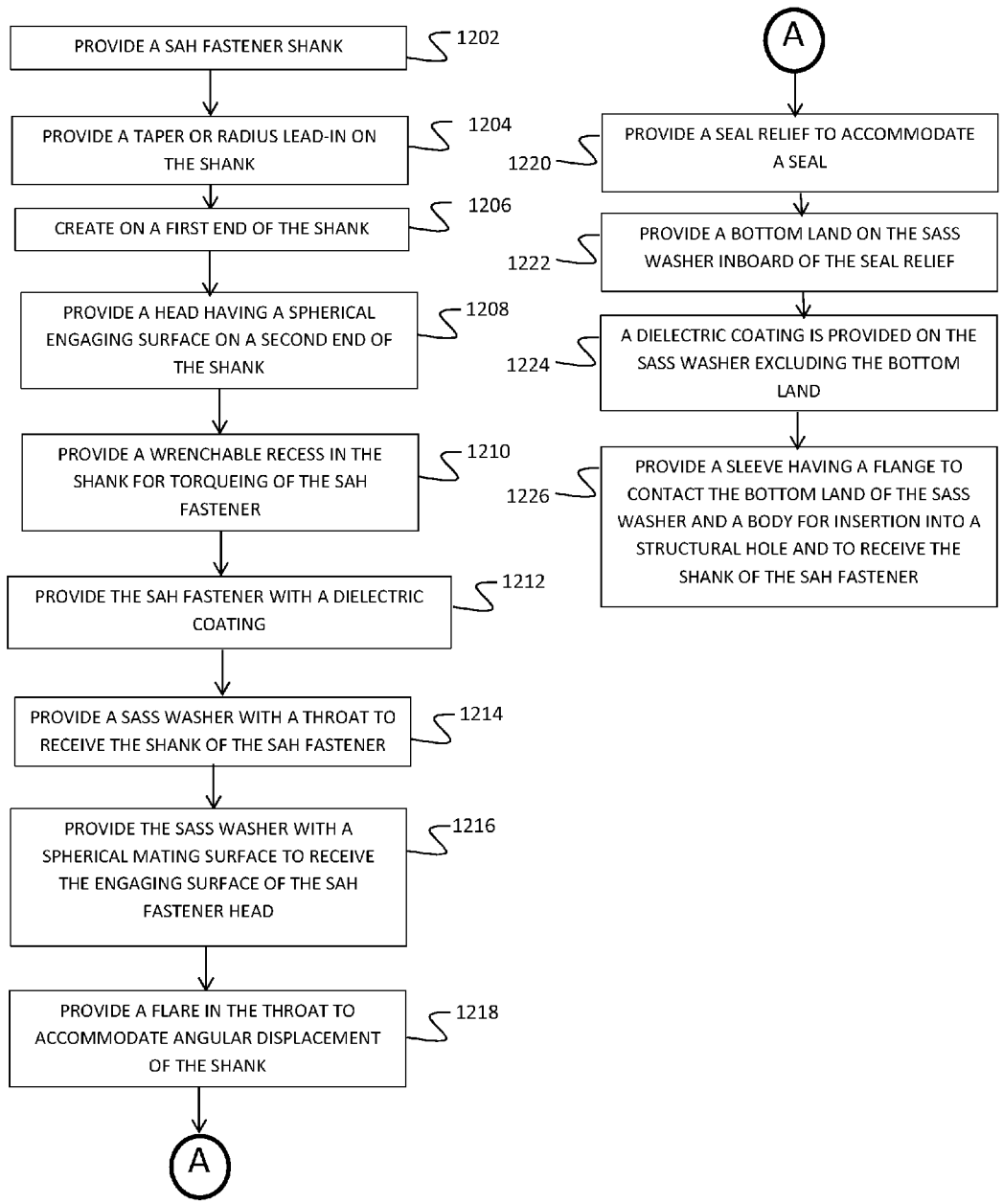
FIG. 12 is a flow chart of a method for fabrication of a fastener system with EME protection.

Fabrication of a fastener system with EME protection may be accomplished as shown in FIG. 12. A SAH fastener shank is provided step 1202 and a taper provided on the shank, step 1204. Threads are created on a first end of the shank, step 1206, and a head having a spherical engaging surface is provided on a second end of the shank, step 1208. A multi-faceted or multi-lobed wrenchable counter-bore such as a hex bore is provided in the shank for counter torque and preventing rotation of the SAH fastener, step 1210. The SAH fastener is provided with a dielectric coating, step 1212. A SASS washer is provided with a throat to receive the shank of the SAH fastener, step 1214 and provided with a spherical mating surface to receive the engaging surface of the SAH fastener head, step 1216. A flare in the throat is provided to accommodate angular displacement of the shank, step 1218. A seal relief is provided to accommodate a seal, step 1220. A bottom land is provided on the SASS washer inboard of the seal relief, step 1222, for contacting a sleeve flange. A dielectric coating is provided on the SASS washer excluding the bottom land, step 1224. A sleeve having a flange to contact the bottom land of the SASS washer and a body for insertion into a structural hole and to receive the shank of the SAH fastener is provided, step 1226.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A fastener system for composite structure providing electromagnetic energy protection comprising:
    a self-aligning head (SAH) fastener having a head with a spherical engaging surface and a shank extending from the head for insertion through a hole in a composite structure;
    a self-aligning self sealing (SASS) washer having a throat receiving the shank and a spherical mating surface interfacing with the spherical engaging surface of the head; and,
    a sleeve received in the hole and receiving the shank of the SAH fastener, said sleeve having a flange and a body, said body sized for insertion into said hole and expansion upon insertion of said shank for an interference fit.

2. The fastener system as defined in claim 1 wherein the SASS washer further incorporates a flare in the throat to accommodate angular displacement of the SAH fastener shank.

3. The fastener system as defined in claim 1 wherein the SASS washer further incorporates a seal relief and further comprising a seal received in the seal relief.

4. The fastener system as defined in claim 1 wherein the SASS washer spherical is bare metal.

5. The fastener system as defined in claim 1 wherein the SAH fastener incorporates threads on the shank distal the head and a wrenching receptacle in the shank.

6. The fastener system as defined in claim 5 wherein the wrenching receptacle is a hex shaped bore.

7. The fastener system as defined in claim 1 wherein the SAH spherical surface is bare metal.

8. The fastener system as defined in claim 1 wherein the SAH fastener shank has a taper for expansion of the sleeve upon insertion.

9. The fastener system as defined in claim 8 wherein the flange and body of the sleeve meet in a fillet for insertion alignment of the SAH fastener shank.

10. The fastener system as defined in claim 1 wherein the SASS washer incorporates a bottom land engaging the flange of the sleeve.

11. The fastener system defined in claim 10 wherein the SASS washer bottom land that engages the sleeve is bare metal.

12. The fastener system as defined in claim 1 wherein the SAH fastener head and SASS washer thickness are predetermined to establish an angular deflection limit for the SAH fastener shank.

13. The fastener system as defined in claim 12 wherein the thickness of the SAH fastener head is in the range of 0.17 to 0.6 times a diameter of the shank and the SASS washer thickness is in the range of 0.19 to 0.67 times a diameter of the shank to provide a range of angular deflection between $+/-2°$ to $+/-7°$.

14. The fastener system as defined in claim 1 wherein the SASS washer has a substantially constant external diameter.

15. The fastener system as defined in claim 14 wherein the SASS washer incorporates a seal relief extending from the external diameter having an angled expansion volume diametrically inward from a pinch surface and further comprising a seal received in the seal relief.

16. The fastener system as defined in claim 15 wherein the seal comprises a rectangular ring having an angle bead received in the angled expansion volume.

17. The fastener system as defined in claim 1 wherein the SASS washer external diameter expands over a thickness washer.

18. The fastener system as defined in claim 17 wherein the external diameter forms a first conical surface and a second conical surface terminating in a cylindrical foot.

19. The fastener system as defined in claim 18 wherein the SASS washer incorporates a seal relief inboard of the cylindrical foot and further comprising a seal received in the seal relief.

20. The fastener system as defined in claim 19 wherein the seal comprises a polymer O-ring having top and bottom rectangular beads.

21. A method for installation of an EME protection fastener system comprising:
    identifying a hole in a composite structure for insertion of a fastener;

inserting a body of a sleeve in the hole with a flange contacting the surface of the structure;

inserting a seal in a seal relief in a self-aligning self sealing (SASS) washer;

positioning the SASS washer over the hole and sleeve flange with a bottom land in contact with the sleeve flange;

inserting a self-aligning head (SAH) fastener into the sleeve;

expanding the sleeve for an interference fit between both the sleeve body and SAH fastener shank and the sleeve body and composite hole;

interfacing a spherical engaging surface on a head of the SAH fastener with a spherical mating surface on the SASS washer to accommodate angular offset in the SAH fastener due to non-orthogonality of the hole; and, torquing a internally threaded fastener on threads in an end of the SAH fastener.

22. The method of claim 21 wherein inserting the SAH fastener into the sleeve is guided by a filleted connection between the flange of the sleeve and the body of the sleeve and a tapered section on a shank of the SAH fastener.

23. The method of claim 21 wherein torquing the internally threaded fastener on the threads employs a wrenchable counter-bore in the shank of the fastener.

24. A method for fabrication of a EME protection fastener system comprising:

providing a self-aligning head (SAH) fastener shank;

providing a taper on the shank;

creating threads on a first end of the shank;

providing a head having a spherical engaging surface on a second end of the shank;

providing a wrenchable counter-bore in the shank for torquing of the SAH fastener;

providing the SAH fastener with a dielectric coating;

providing a self-aligning self sealing (SASS) washer with a throat to receive the shank of the SAH fastener;

providing the SASS washer with a spherical mating surface to receive the engaging surface of the SAH fastener head;

providing a flare in the throat to accommodate angular displacement of the shank;

providing a seal relief to accommodate a seal;

providing a bottom land on the SASS washer inboard of the seal relief for contacting a sleeve flange;

providing a dielectric coating on the SASS washer excluding the bottom land; and, providing a sleeve having a flange to contact the bottom land of the SASS washer and a body for insertion into a structural hole and to receive the shank of the SAH fastener, said body sized for insertion into said hole and expansion upon insertion of said shank for an interference fit.

* * * * *